United States Patent
Hus

(10) Patent No.: US 6,349,776 B1
(45) Date of Patent: Feb. 26, 2002

(54) AGRICULTURAL ASSEMBLY HAVING CHANGEABLE TOOLS

(76) Inventor: Shih Hao Hus, No. 426, Dou Yuan East Road, Bi Tou Hsiang, Chang Hua Hsien (TW)

( * ) Notice: Subject to any disclaimer, the term of this patent is extended or adjusted under 35 U.S.C. 154(b) by 0 days.

(21) Appl. No.: 09/610,029

(22) Filed: Jul. 5, 2000

(51) Int. Cl.$^7$ .............................................. A01B 45/00
(52) U.S. Cl. ........................................ 172/375; 172/22
(58) Field of Search ............................ 172/22, 25, 371, 172/375, 378; 294/505, 50.6, 50.8, 50.9

(56) References Cited

U.S. PATENT DOCUMENTS

| | | | |
|---|---|---|---|
| 4,585,072 A | * | 4/1986 | Martinez ...................... 172/22 |
| 4,905,768 A | | 3/1990 | Lorenz ......................... 172/25 |
| 5,234,241 A | | 8/1993 | Ikerd .......................... 294/50.8 |
| 5,452,767 A | * | 9/1995 | Smotherman ................ 172/25 |
| 5,810,093 A | * | 9/1998 | Howard ....................... 172/111 |
| 5,865,259 A | * | 2/1999 | Catto .......................... 172/25 |

* cited by examiner

Primary Examiner—Robert E. Pezzuto
(74) Attorney, Agent, or Firm—Charles E. Baxley

(57) ABSTRACT

An agricultural includes a shaft slidably received in a tube, a foot rest rotatably engaged on the tube, and one or more tool members changeably secured to the tube. One of the tool members includes a plate secured to the tube, and a housing secured to the plate for engaging into the soil and having two casings. A board is slidably received in the housing and coupled to the shaft with couplers for disengaging the soil received in the housing. A lock device may detachably lock the shaft to the tube. The tool member may be a weed remover or a soil loosener.

12 Claims, 8 Drawing Sheets

AGRICULTURAL ASSEMBLY HAVING CHANGEABLE TOOLS

BACKGROUND OF THE INVENTION

1. Field of the Invention

The present invention relates to an agricultural device, and more particularly to an agricultural assembly having changeable tools.

2. Description of the Prior Art

Typical agricultural devices each is provided for a particular use and may not be provided for the other uses, such that a number of agricultural devices are required for each family. For example, U.S. Pat. No. 4,905,768 to Lorenz discloses a manual agricultural implement having a tool attached to the bottom of a shaft and may not be replaced with the other tools. U.S. Pat. No. 5,234,241 to Ikerd discloses a weed remover having a garden tool attached to the bottom of a shaft and also may not be replaced with the other tools.

The present invention has arisen to mitigate and/or obviate the afore-described disadvantages of the conventional agricultural devices.

SUMMARY OF THE INVENTION

The primary objective of the present invention is to provide an agricultural assembly having one or more tool members that may be adjustably or changeably secured onto a supporting tube.

In accordance with one aspect of the invention, there is provided an agricultural assembly comprising a tube including an upper portion and a lower portion, a foot rest including a sleeve rotatably engaged on the tube, a first tool member, a second tool member, and securing means for changeably securing the first tool member and the second tool member to the lower portion of the tube.

The first tool member includes a plate secured to the lower portion of the tube with the securing means, and a housing secured to the plate for engaging into soil. The housing includes two casings secured to the plate, the casings each includes two sides each having at least one ear secured together for forming the housing. The plate includes at least one socket provided therein, the housing includes at least one catch engaged with the at least one socket for securing the housing to the plate.

A soil disengaging means is further provided for disengaging the soil from the housing and includes a board slidably received in the housing, a shaft slidably received in the tube and secured to board for moving the board relative to the housing. The shaft includes a first coupler, the board includes a second coupler for engaging with the first coupler and for securing the board to the shaft.

A locking means is further provided for detachably locking the shaft to the tube and includes a latch secured on the tube and engaged with the shaft for securing the shaft to the tube. The tube includes a handle secured on top thereof, the latch includes a first end secured to the handle and including a second end and including an orifice formed therein for receiving the shaft, and means for biasing the latch to engage with the shaft and to lock the shaft to the tube.

The second tool member includes a plate secured to the lower portion of the tube with the securing means, and a plurality of projections extended downward from the plate. Or, the second tool member includes a plate secured to the lower portion of the tube with the securing means, a seat secured to the plate and having a plurality of spikes extended therefrom for engaging into the soil, and a panel slidably engaged on the spikes for moving the spikes toward and away from each other when the panel is moved relative to the spikes.

The shaft includes a first coupler, the panel includes a second coupler for engaging with the first coupler and for securing the panel to the shaft. A guiding means is further provided for guiding the panel to move relative to the plate and includes at least one pole extended from the panel and slidably engaged through the plate.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
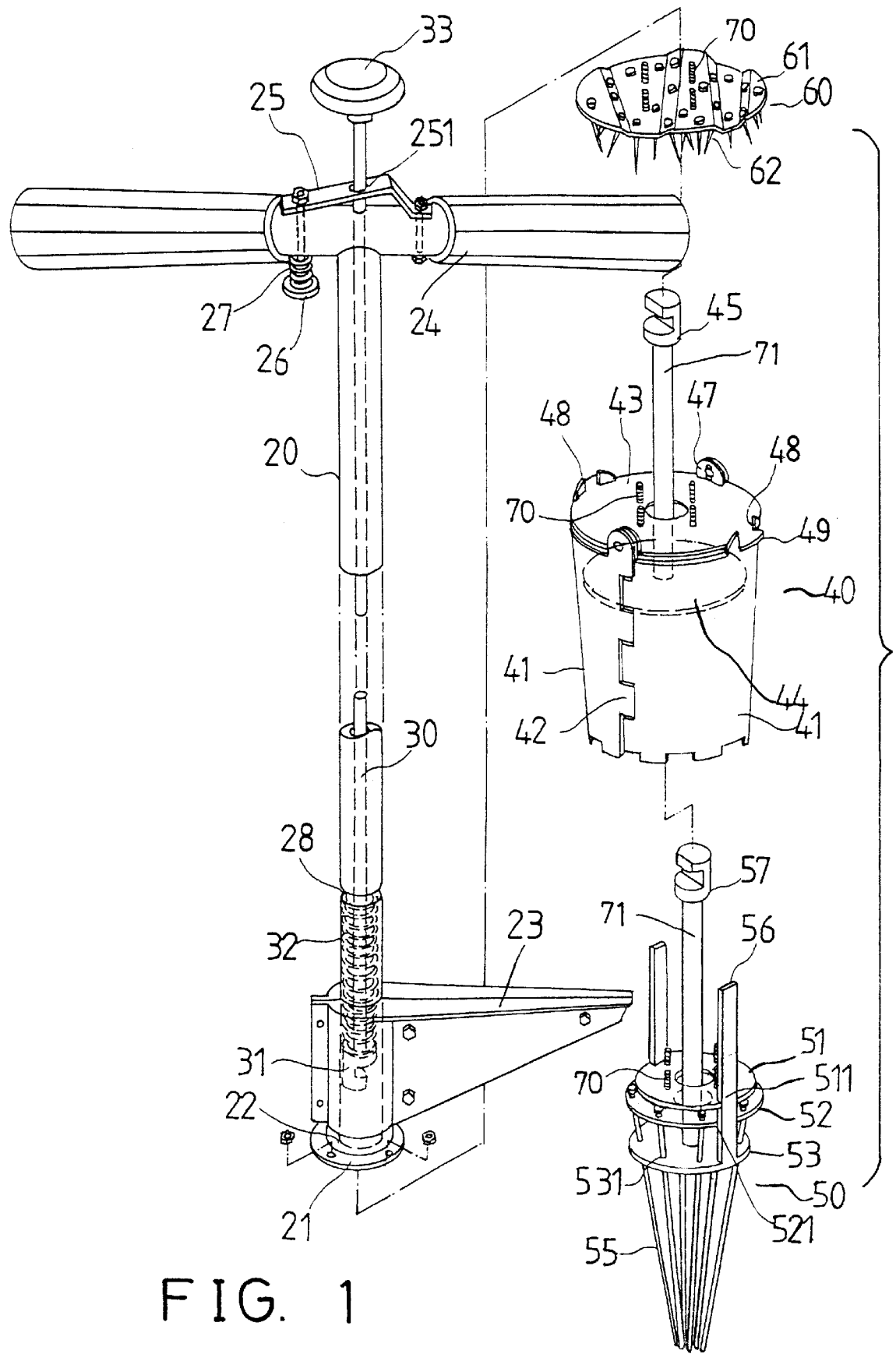
FIG. 1 is an exploded view of an agricultural assembly in accordance with the present invention.
Figure 2:
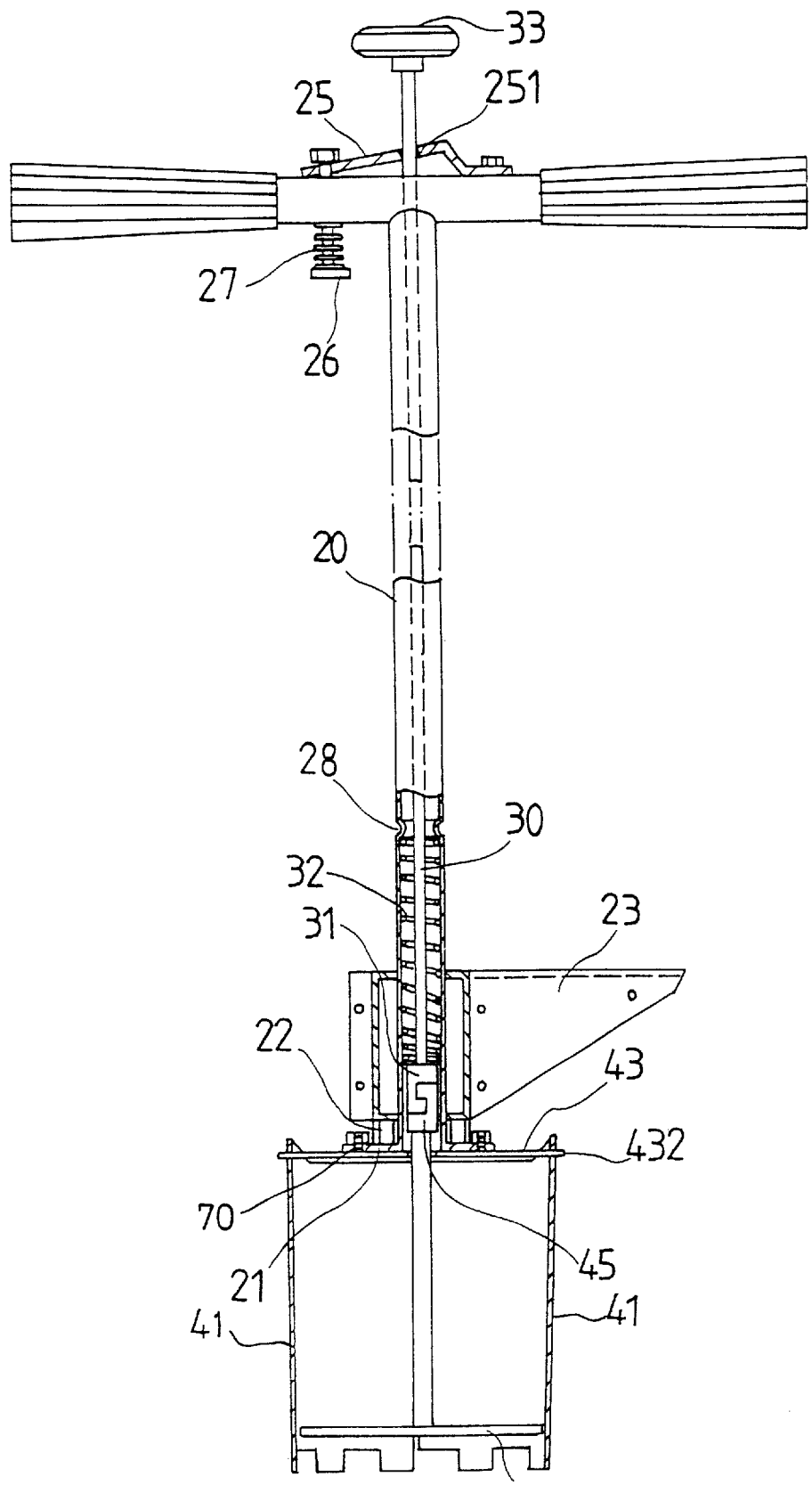
FIG. 2 is a plane schematic view of the agricultural assembly, in which a portion of the agricultural assembly has been cut off for showing the inner structure of the agricultural assembly.

Referring to the drawings, and initially to FIGS. 1 and 2, an agricultural assembly in accordance with the present invention comprises a tube 20 including a base 21 secured to the bottom and a handle 24 secured on top. A sleeve 22 is rotatably engaged on the tube 20 and preferably supported on the base 21 and includes a foot rest 23 secured thereon. A shaft 30 is slidably and/or rotatably engaged in the tube 20 and includes a bottom end extendible outward of the tube 20 and having a coupler 31, such as a hook 31 secured thereto. The shaft 30 includes an upper end extendible outward of tube 20 and having a hand grip 33 secured thereon. The tube 20 includes a stop, such as a peripheral stop 28 extended inward thereof. A spring 32 is engaged between the stop 28 and the coupler 31 for biasing the shaft 30 and the coupler 31 downward relative to the tube 20.

A latch 25 is secured on the tube 20 or has one end secured to the handle 24, and has a knob 26 secured to the other end and slidably engaged through the handle 24. The latch 25 has an orifice 251 formed therein for slidably receiving the shaft 30. A spring 27 is engaged with the knob 26 for biasing the other end of the latch 25 toward the handle 24 and for biasing the latch 25 to engage with the shaft 30 and to lock the shaft 30 to the tube 20 (FIGS. 2, 3, 5, 6). When the shaft 30 is moved upward relative to the latch 25, the latch 25 may be moved upward against the spring 27 such that the shaft 30 may be moved upward relative to the latch 25. But, the shaft 30 may not be moved downward relative to the latch 25. Or, when the other end of the latch 25 is moved away from the handle 24 by depressing the knob 26 against the spring 27 (FIGS. 4, 7), the latch 25 may be disengaged from the shaft 30 such that the shaft 30 is not locked to the tube 20 and may be freely slided along the tube 20.

Figure 8:
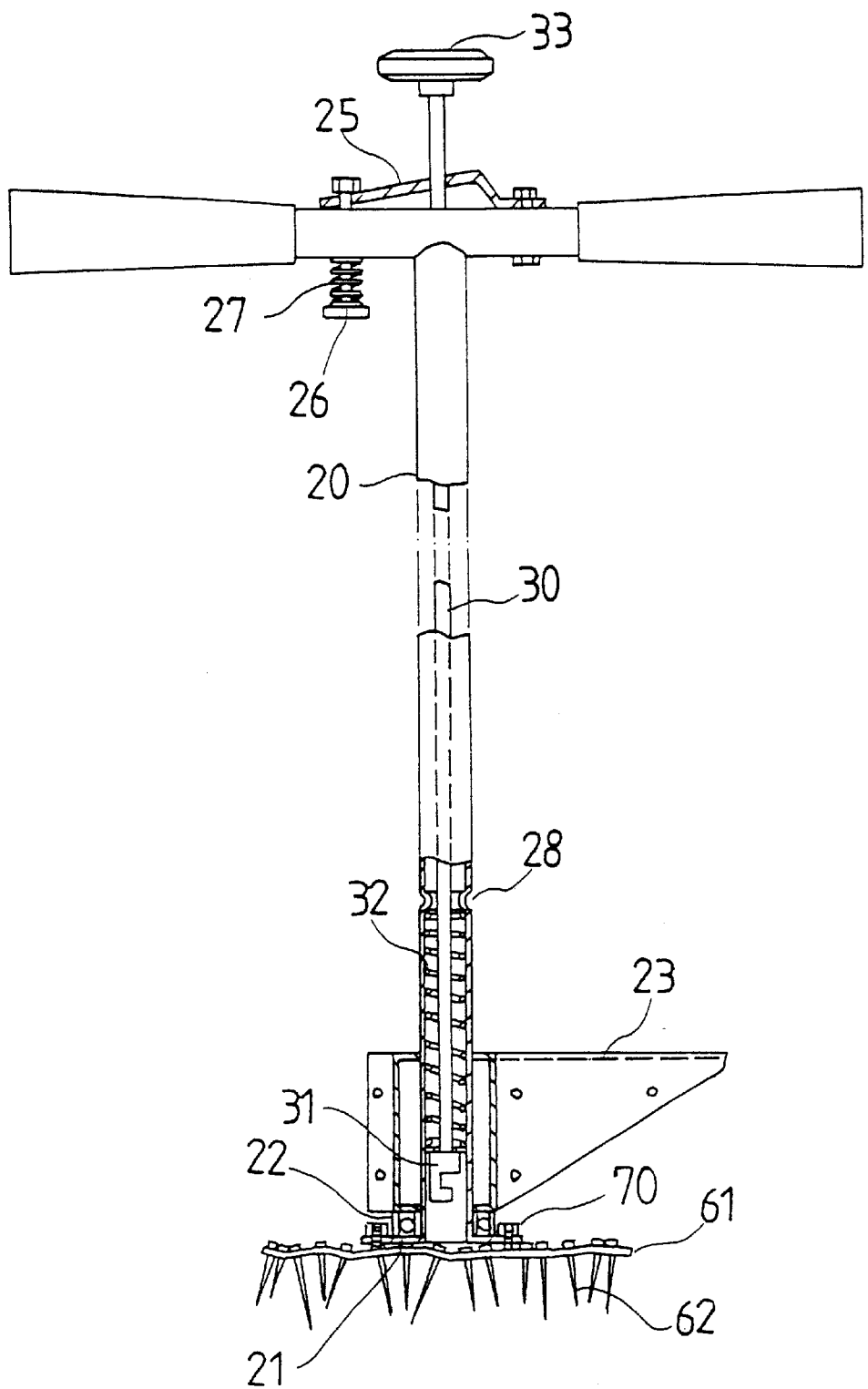

One or more tool members, such as a soil loosener 60, an excavator 40, and a weed remover 50 each includes a plate 61, 43, 51 having one or more fasteners 70 provided thereon and detachably secured to the base 21 for detachably securing the soil loosener 60 and the excavator 40 and the weed remover 50 to the tube 20. The soil loosener 60 includes a number of projections 62 extended downward from the plate 61 and directed to various directions (FIGS. 1, 8) for loosening the soil 80 when the soil loosener 60 is rotated by the handle 24 via the tube 20 and when the user is stepped on the foot rest 23.

Figure 3:
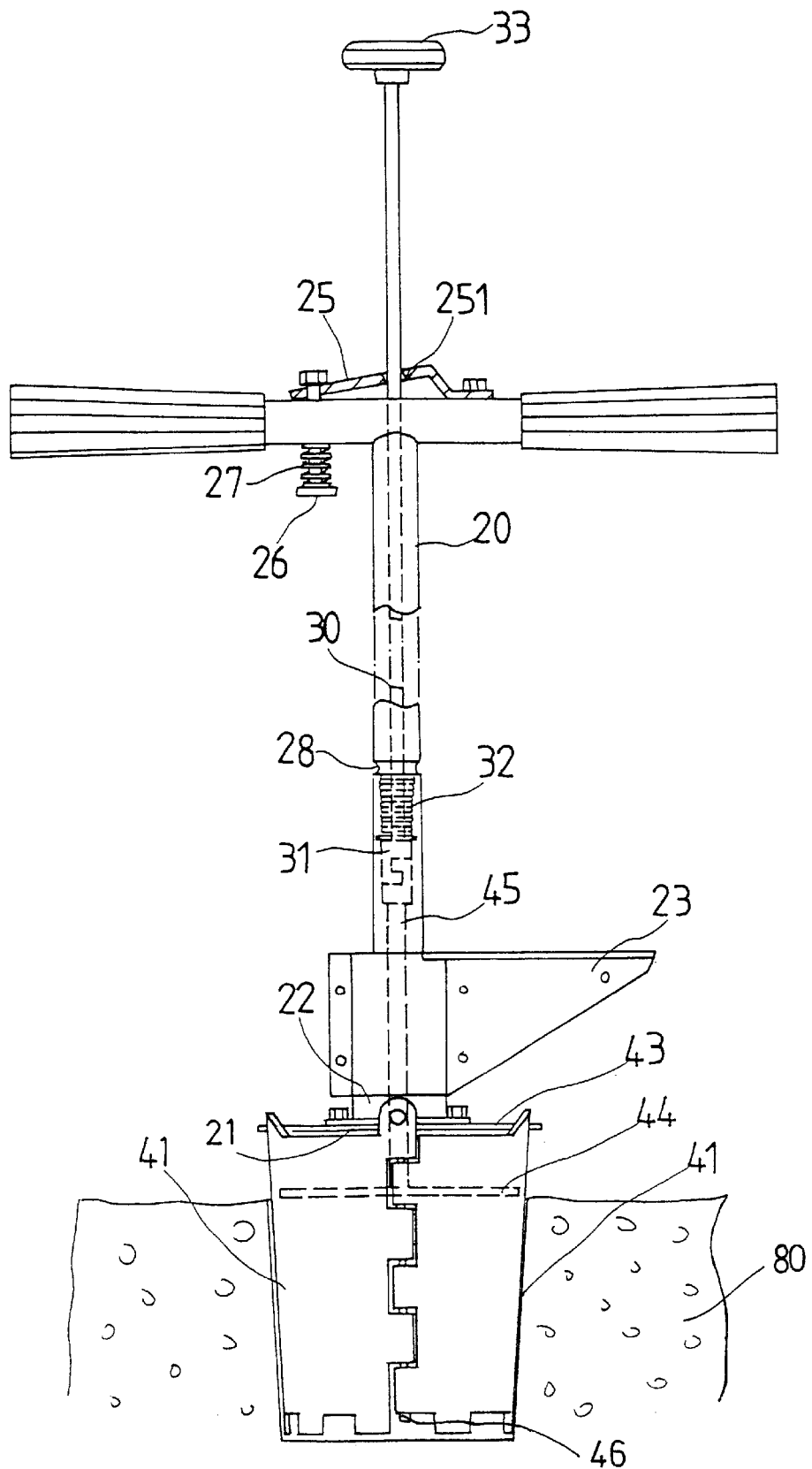
FIGS. 3, 4, 5, 6, 7, 8 are plane schematic views similar to FIG. 2, illustrating the operation of the agricultural assembly.
Figure 4:
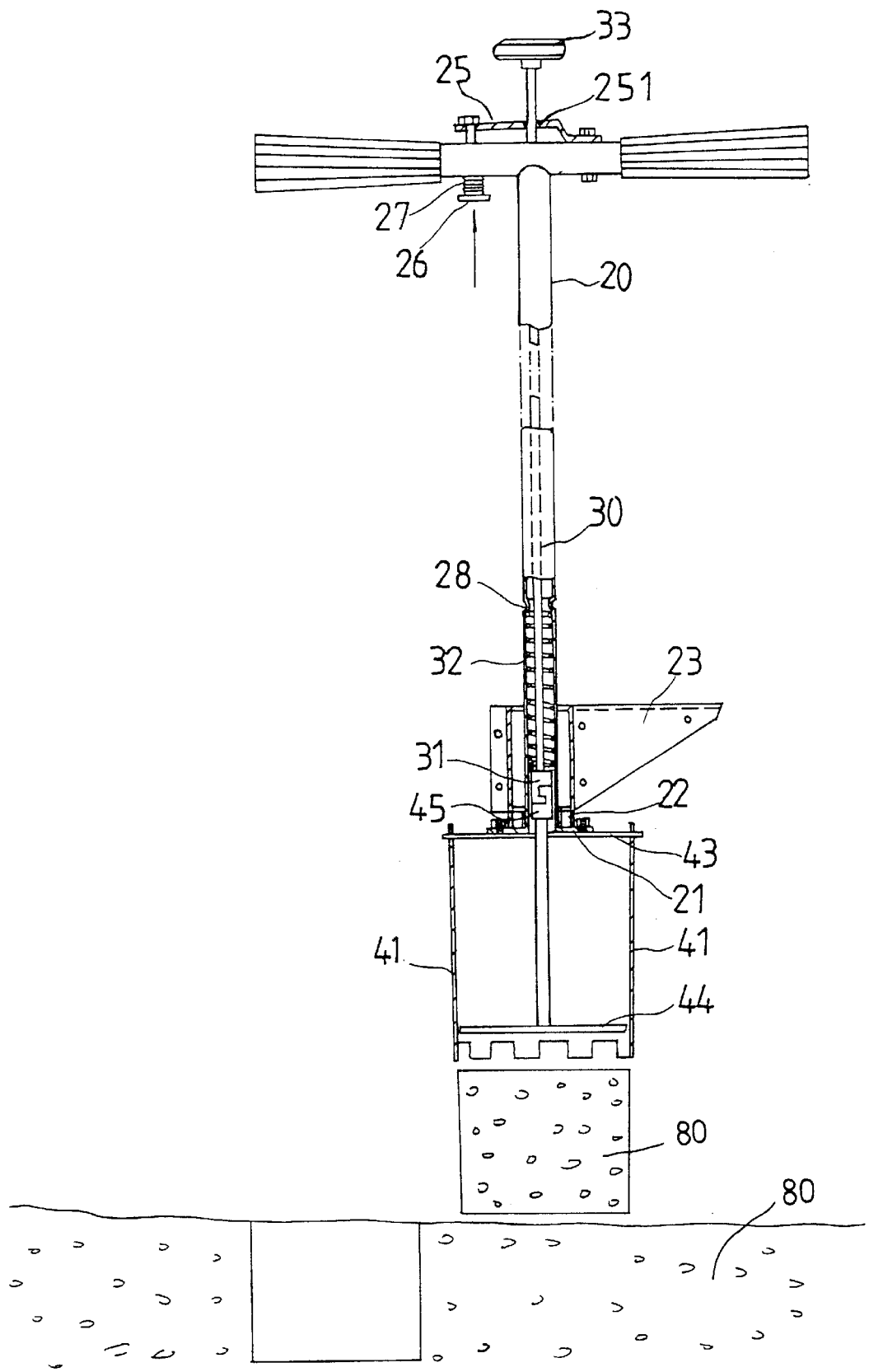
Figure 5:
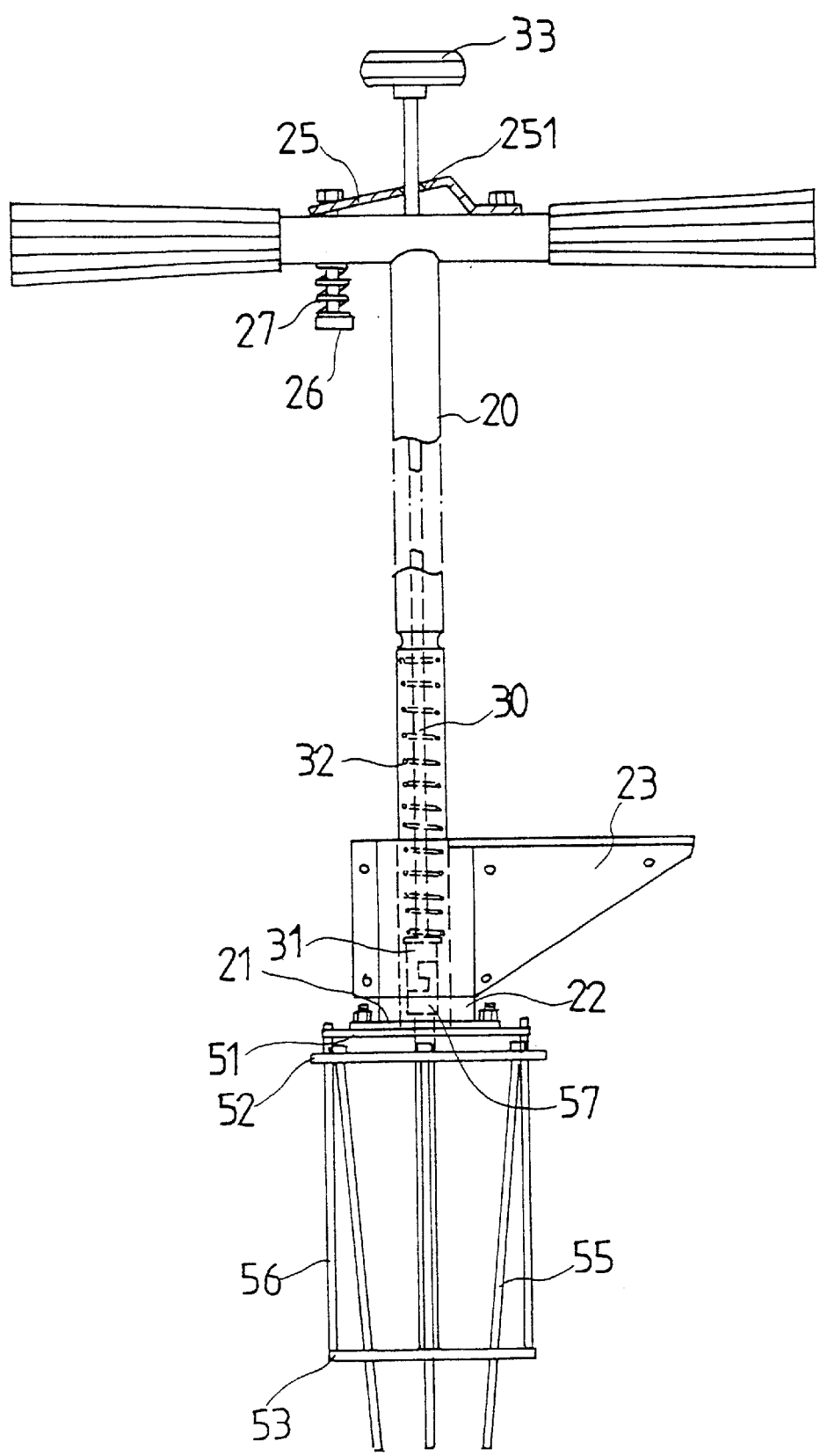
Figure 6:
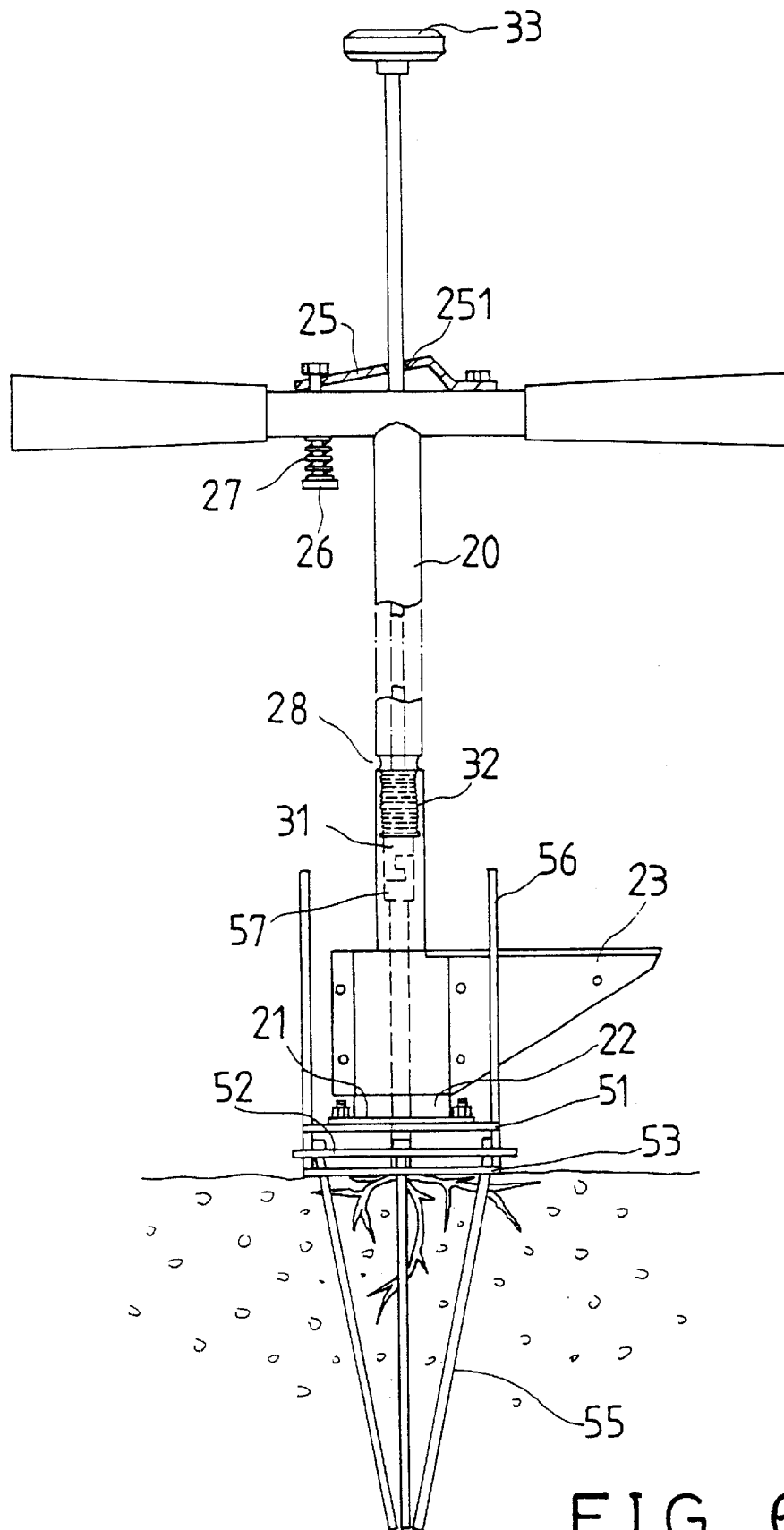

Referring to FIGS. 1–4, the excavator 40 comprises a cylindrical housing (41) including two casings 41 each having a semi-cylindrical shape, and each having one or more side ears 42 secured together by rods 46 (FIG. 3). The housing or the casings 41 have one or more flaps 47 extended upward therefrom and secured to the plate 43 by fasteners, and have one or more sockets 48 provided on top for receiving the catches 49 of the plate 43, and for solidly securing the casings 41 to the plate 43. The casings 41 may be forced into the soil 80 to excavate the soil 80 (FIG. 4) by stepping onto the foot rest 23. A board 44 is slidably received in the casings 41 and has a post 71 extended upward through the plate 43 and has a coupler 45, such as a hook 45 secured on the post 71 for hooking with the coupler 31 when the coupler 31 is moved outward of the tube 20. The board 44 is engaged on the soil 80 (FIG. 3) and may be relatively moved upward relative to the casings 41 against the spring 32 when the casings 41 are forced into the soil 80 by the user. The shaft 30 may be moved upward relative to the latch 25, but may not be moved downward relative to the latch 25 which may lock the shaft 30 to the tube 20. As shown in FIG. 4, when the knob 26 is depressed against the spring 27, the latch 25 may be disengaged from the shaft 30 such that the board 44 may be moved downward by the shaft 30 to disengage the soil 80 from the casings 41.

Figure 7:
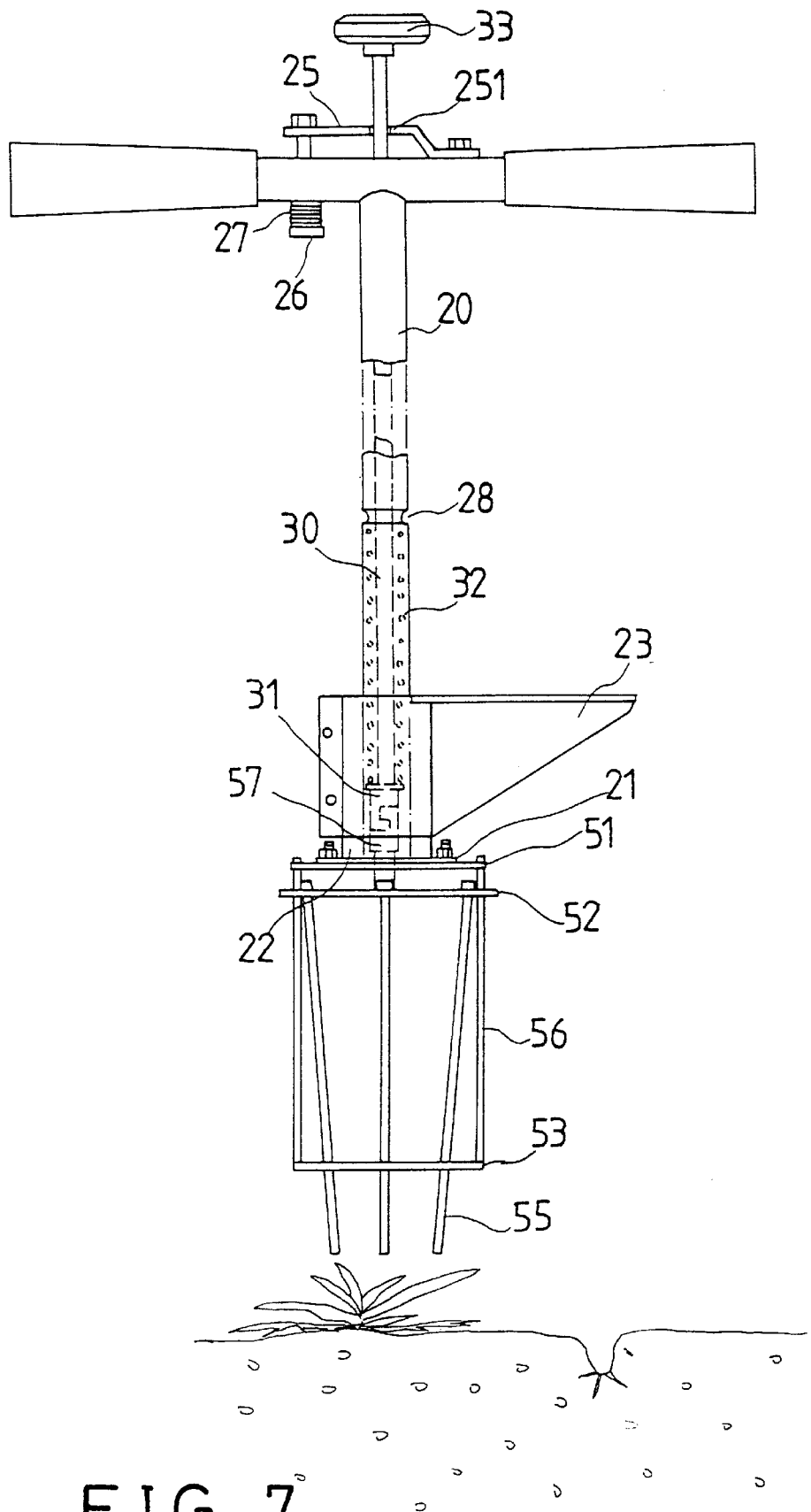

As shown in FIGS. 1 and 5–7, the weed remover 50 includes a seat 52 secured to the plate 51 by such as the fasteners, and includes a number of spikes 55 extended inclinably downward from the seat 52. A panel 53 has a number of orifices 531 formed therein for slidably receiving the spikes 55, and has one or more poles 56 extended therefrom and slidably engaged through the guide openings 511, 521 of the plate 51 and the seat 52 for guiding the panel 53 to move toward and away from the seat 52 and the plate 51. The panel 53 includes a post 71 extended upward through the plate 51 and the seat 52 and has a coupler 57, such as a hook 57 secured on the post 71 for hooking with the coupler 31. The panel 53 may be engaged on the soil 80 (FIG. 6) and may be relatively moved upward relative to the spikes 55 when the spikes 55 are forced into the soil 80 by the user. The shaft 30 may also be moved upward relative to the latch 25, but may not be moved downward relative to the latch 25 which may lock the shaft 30 to the tube 20. As shown in FIG. 7, when the knob 26 is depressed against the spring 27, the latch 25 may be disengaged from the shaft 30 such that the panel 53 may be moved downward by the shaft 30 to disengage the weed or the soil from the spikes 55. The lower portions of the spikes 55 may be moved away from each other when the panel 53 is moved downward relative to the spikes 55, and may be moved toward each other when the panel 53 is moved upward relative to the spikes 55. The operation of the spikes 55 has been disclosed in U.S. Pat. No. 5,234,241 to Ikerd which is taken as a reference for the present invention.

Accordingly, the agricultural assembly in accordance with the present invention includes one or more tool members that may be adjustably or changeably secured onto a supporting tube.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An agricultural assembly comprising:
   a) a tube including an upper portion and a lower portion;
   b) a shaft slidably received in said tube and including a first coupler attached to said shaft and movable in concert with said shaft relative to said tube, said first coupler being slidably received in said lower portion of said tube and movable and extendible outward of said lower portion of said tube when said tube is moved relative to said shaft;
   c) a sleeve rotatably engaged on said tube and including a foot rest provided thereon;
   d) a first tool element secured to said lower portion of said tube for being forced into soil by said foot rest; and
   e) a second tool element including a second coupler provided thereon and engaged with said first coupler when said first coupler is moved and extended outward of said lower portion of said tube, for selectively attaching said second tool element to said shaft, said first coupler and said second coupler being secured together when said first coupler and said second coupler are slidably received in said tube;
   said first tool element being movable downward relative to said second tool element, and said second tool element being movable upward relative to said first tool element when said first tool element is forced into the soil by said foot rest.

2. The agricultural assembly according to claim 1, wherein said first tool element includes a housing secured to said lower portion of said tube for engaging into soil.

3. The agricultural assembly according to claim 2, wherein said housing includes two casings each having two sides, said sides of said casings each includes at least one ear secured together for forming said housing.

4. The agricultural assembly according to claim 2, wherein said first tool element includes a plate secured between said lower portion of said tube and said housing, said plate includes at least one socket provided therein, said housing includes at least one catch engaged with said at least one socket for securing said housing to said plate.

5. The agricultural assembly according to claim 2, wherein said second tool element includes a board slidably received in said housing, and a post extended from said board and having said second coupler secured thereon for coupling to said first coupler of said shaft.

6. The agricultural assembly according to claim 1 further comprising locking means for detachably locking said shaft to said tube.

7. The agricultural assembly according to claim 6, wherein said locking means includes a latch secured on said tube and engaged with said shaft for securing said shaft to said tube.

8. The agricultural assembly according to claim 6, wherein said tube includes a handle secured on top thereof, said latch includes a first end secured to said handle and including a second end and including an orifice formed therein for receiving said shaft, and means for biasing said latch to engage with said shaft and to lock said shaft to said tube.

9. The agricultural assembly according to claim 1, wherein said first tool element includes a plate secured to said lower portion of said tube, a seat secured to said plate and having a plurality of spikes extended therefrom for engaging into the soil, said second tool element includes a panel slidably engaged on said spikes for moving the spikes toward and away from each other when the panel is moved relative to said spikes.

10. The agricultural assembly according to claim 9 further comprising guiding means for guiding said panel to move relative to said plate.

11. The agricultural assembly according to claim 10, wherein said guiding means includes at least one pole extended from said panel and slidably engaged through said plate.

12. The agricultural assembly according to claim 1, wherein said first tool member includes a plate secured to said lower portion of said tube when said second tool member is disengaged from said shaft, said plate includes a plurality of projections extended downward from said plate.

* * * * *